United States Patent [19]
Chesterton, Jr. et al.

[11] 3,710,250
[45] Jan. 9, 1973

[54] DYNAMOMETER INDICATOR SYSTEM

[75] Inventors: Stanley Keith Chesterton, Jr., North Wales; William J. Samph, Quakertown, both of Pa.

[73] Assignee: Ametek, Inc., New York, N.Y.

[22] Filed: May 6, 1970

[21] Appl. No.: 35,211

[52] U.S. Cl. .................................. 324/115, 324/150
[51] Int. Cl. ......................... G01r 15/08, G01r 1/20
[58] Field of Search ............... 324/115, 150, 144, 74

[56] References Cited

UNITED STATES PATENTS

| | | | |
|---|---|---|---|
| 2,851,663 | 9/1958 | Kelly | 324/150 X |
| 1,772,760 | 8/1930 | Rouse | 324/115 |
| 3,486,112 | 12/1969 | Bayer | 324/74 X |
| 3,490,043 | 1/1970 | Faria | 324/150 |
| 2,419,100 | 4/1947 | Weaver | 324/150 |
| 2,788,491 | 4/1957 | Millar | 324/144 X |
| 2,897,446 | 7/1959 | Rich | 324/144 X |

*Primary Examiner*—Rudolph V. Rolinec
*Assistant Examiner*—Ernest F. Karlsen
*Attorney*—Smythe & Moore

[57] ABSTRACT

A dynamometer indicator instrument has a closed magnetic ring having an arcuate pole member within the ring connected to the inner periphery of the ring by a shank portion. A field coil surrounds the shank portion, and an armature coil encircles the arcuate pole member and is pivotally mounted at the center of curvature thereof. An indicator pointer moves in response to movement of the armature. The instrument is provided with electrical circuit means for self testing of the instrument as desired and an electrical circuit for zero and range adjustment.

4 Claims, 6 Drawing Figures

PATENTED JAN 9 1973
3,710,250
SHEET 1 OF 3
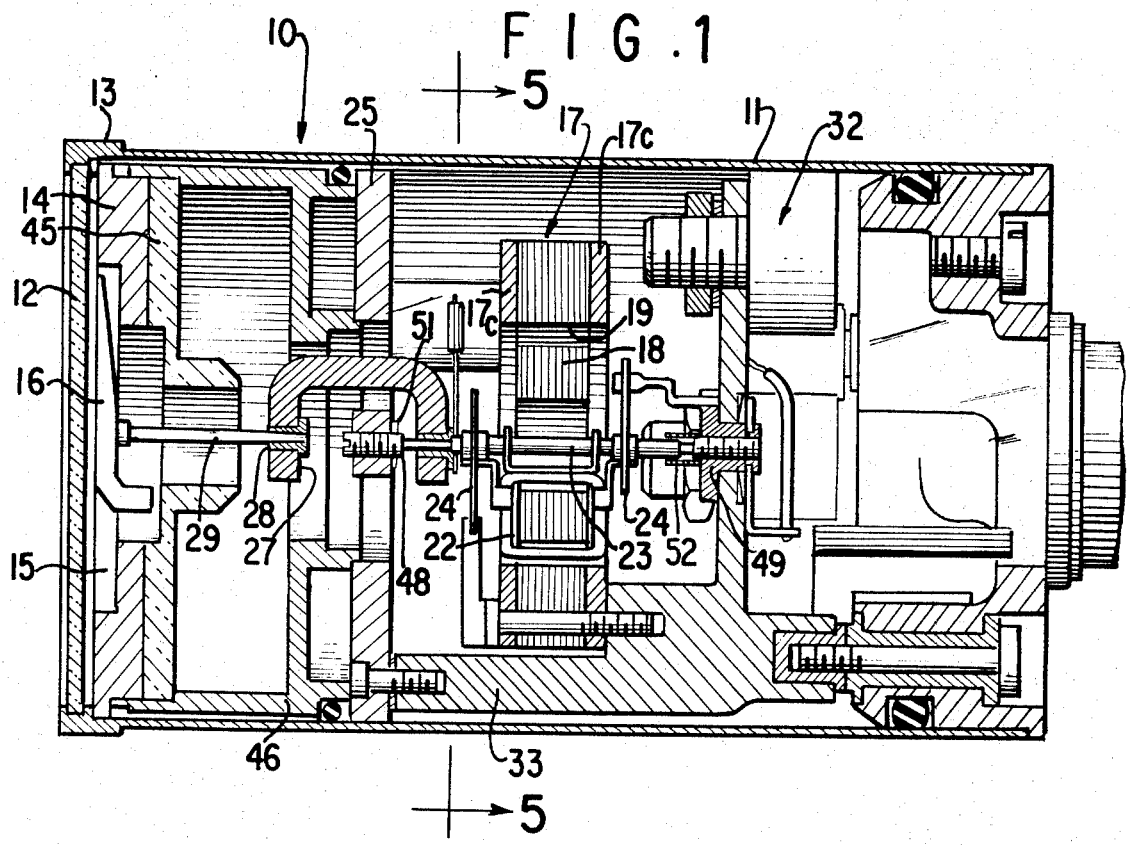
FIG.1
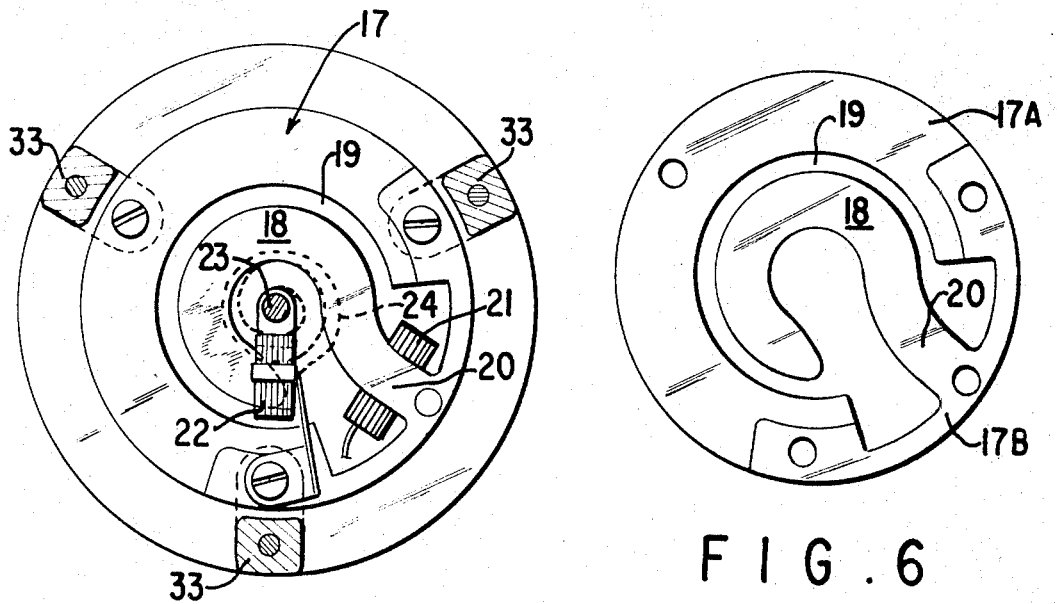
FIG.5
FIG.6
INVENTORS
STANLEY KEITH CHESTERTON, JR
WILLIAM J. SAMPH
BY
Smythe & Moore
ATTORNEYS

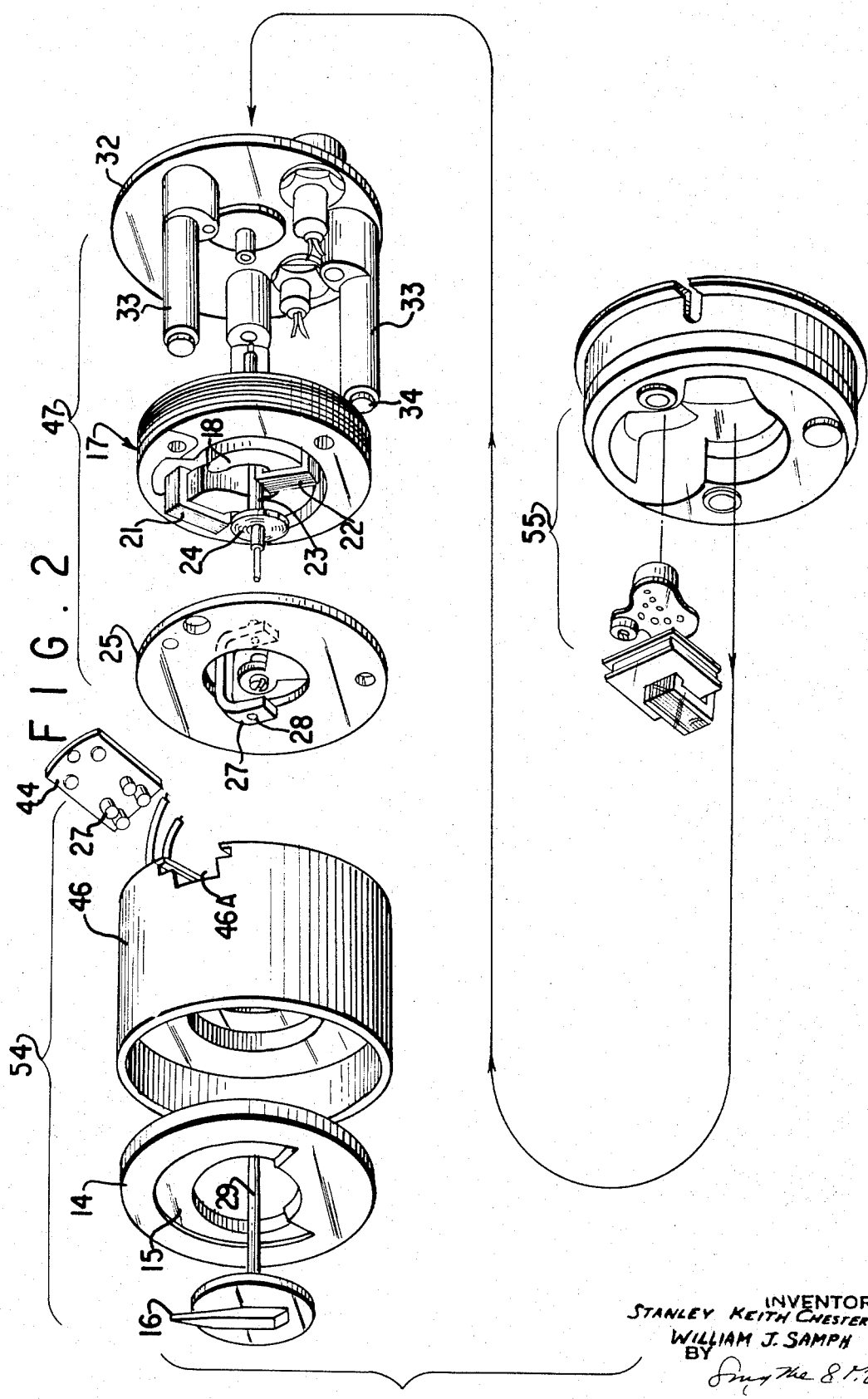

DYNAMOMETER INDICATOR SYSTEM

Various forms of indicating systems have been devised for application to aircraft for monitoring functions such as oil, fuel and hydraulic pressure. One such system is a variable reluctance remote pressure indicating system which comprises a transmitter suitably mounted to be responsive to the pressure being measured and an indicator mounted in the cabin upon which the sensed pressure is indicated for the flight crew. One form of indicator is a dynamometer instrument which may operate on the null balance principle. The null balance is one which functions so that at each indicating position of the instrument, the net torque acting on the armature coil is zero. While such instruments have been generally satisfactory, their construction has been such so as to make the maintenance or repairing of such very difficult.

One of the objects of the present invention is to provide an improved dynamometer indicator instrument.

Another of the objects of the present invention is to provide a dynamometer instrument having a self-test unit.

A still further object of the invention is to provide a modular construction to facilitate servicing of the instrument.

According to one aspect of the present invention, a dynamometer instrument may comprise a closed magnetic ring having an arcuate pole member within the ring and closely spaced therefrom to define an air gap therebetween. Preferably, the ring comprises at least two segments. The pole member has a shank portion attached to the inner periphery of the magnetic ring. A field coil surrounds the shank portion to produce a flux across the air gap and an armature coil is pivotally mounted at the center of curvature of the arcuate pole member and encircles the pole member. An indicator pointer is operatively connected to the armature so as to be movable in response thereto. The instrument is provided with electrical circuit means for selectively testing the instrument to determine whether or not the indicator is operative. It also has an electrical circuit means for zero and range adjustment.

Other objects, advantages and features of the present invention will be apparent from the accompanying description and drawings, which are merely exemplary.

In the drawings:

FIG. 1 is a longitudinal sectional view of the indicator instrument according to the present invention;

FIG. 2 is an exploded view in perspective of the indicator of FIG. 1;

FIG. 5 is a sectional view looking in the direction 5—5 of FIG. 1; and

FIG. 6 is a reduced scale view of a lamination.

Proceeding next to the drawings wherein like reference symbols indicate the same parts throughout the various views, a specific embodiment of the present invention will be described in detail.

Figure 3:
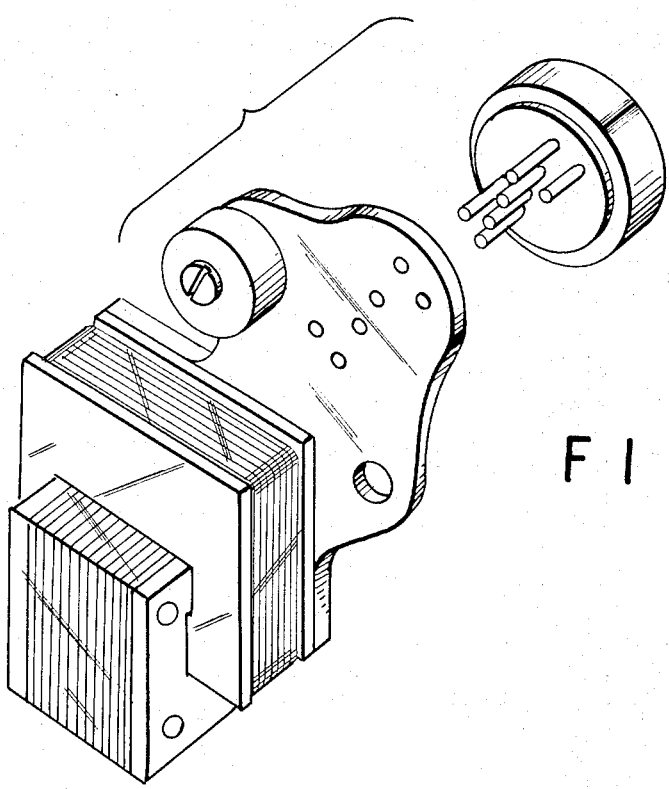
FIG. 3 is an exploded view in perspective in enlarged scale of the self-test unit according to the present invention.

The indicator, according to the present invention and as shown in FIG. 1, comprises casing 11, one end of which is closed by a transparent cover plate or lens 12 in close proximity to the light head 54. Dial face 13 of dial 14, if desired, may have a sector-shaped recess portion 15 (FIG. 2). A scale or suitable indicia is disposed on the dial face 13 which may be lighted by lighting means 44 through diffuser 45 (FIG. 1) located in housing 46. Pointer 16 moves adjacent to the scale. As seen in FIG. 2, the lighting means 44 can be mounted on removable slide 44A which is insertable through aperture 46A into position in the case. This permits ready replacement thereof. Pointer 16 is moved in response to dynamometer arrangement 47 (FIg. 2) which comprises a segmented magnetic ring 17 (FIGS. 1, 3, 5 and 6) having an arcuate or hook-shaped pole member 18 therein, the outer peripheral surface of which is closely spaced relative to the inner peripheral surface of ring segment 17A (FIG. 6) so as to provide gap 19. Shank portion 20, integrally connecting pole member 18 to the inner periphery of ring segment 17B, is surrounded by field coil 21, producing flux across air gap 19.

The segmented magnetic magnetic ring preferably is laminated and made in two segments 17A, 17B and interfitted as seen in FIG. 6. The magnetic ring is segmented to allow for easy assembly of the field coil thereto. The joint is shaped, as shown in FIG. 6, to allow positive positioning and to eliminate need for magnetic fillers. This shape is such that it positively and accurately locates ring segment 17A with respect to hook 18 so that the air gap between them does not vary more than 0.001 inch. Cover plates 17C (FIG. 1) can be used to retain the ring segments. THe segments also may be joined by the same epoxy used to assemble the laminations so as to eliminate the need for cover plates 17C.

Moving armature coil assembly 22 has an inner periphery that closely encircles the pole member 18. Coil assembly 22 is joined to shaft 23 located at the center of the radius of curvature of the arcuate pole member. The shaft has cone-shaped ends pivotally engaging bearings 48 and 49, respectively. The bearing 48 is carried by top plate 25 which is fixedly mounted to three posts 33 of frame 32.

Bearing 49 is carried by spring mount 50 that is adjustably mounted in frame 32. According to usual practice, each bearing 48 and 49 is mounted for adjustment lengthwise of the shaft and is secured in place by lock nut 51 and dash pot 52.

Lead connections to the armature coil are made by way of respective hair springs 24, only one of which is shown in FIG. 2. The hair springs have their inner ends secured insulatedly to the shaft and are electrically connected to the armature coil. The outer ends of the springs are connected to terminals 50 and 53.

A U-shaped arm 27 is fixedly mounted to the coil shaft 23, the arm passing through slot 26 in top plates 25. The outer end of bracket 28 is provided with socket 28A which tightly receives spindle shaft 29 of pointer 16.

The dynamometer instrument 10 herein is preferably constructed in a modular type assembly wherein each section or module can be assembled and calibrated outside of the instrument. The modules consist of the light head 54, dynamometer movement 47 and the self-test section 55.

Figure 4:
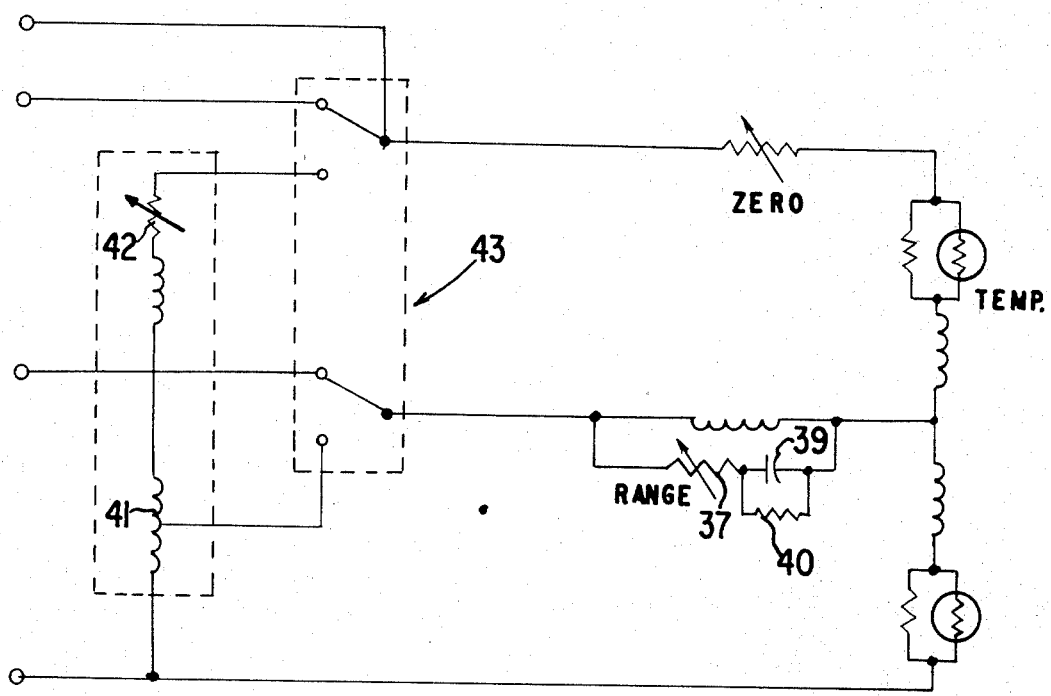
FIG. 4 is an electrical diagram illustrating schematically the electrical components of the self-test unit of FIG. 3.

It is desirable to be able to test the accuracy of an indicator at a predetermined point on the dial. A tapped inductor 41 (FIG. 4), preferably a tapped coil, is used to simulate the output of a transmitter. Such may be self-contained in the indicator. Methods of adjustment of the self-test circuit may include a variable resistor 42 in series with the inductor or may include a movable slug in one side of a tapped coil or inductor. Such will change the relationship of the tap and vary the current flow through the moving coil 21 which, in turn, changes the deflection or position of the pointer. By use of an integral switch 43, the self test can be operated while the indicator is still connected in the system. Switch 43 disconnects the moving coil from the transmitter and connects to the self-test coil and vice versa.

The self-test circuit is preferably fixedly mounted in base 56 of the instrument.

By the use of capacitor 39, which is parallel with the moving coil 22, it is possible too change the power factor of the applied voltage to change the range of the instrument. The adjustment is accomplished by the use of either a variable resistor 37 in series with the fixed capacitor or with a fixed resistor in series with a variable capacitor in parallel with the moving coil. Since this change in the power factor does not affect the current, it therefore does not affect the applied torque. The range adjustment with the described circuit is in direct relationship with the amount of the applied voltage. Therefore, at the minimum indication, where the applied voltage is at a minimum, the amount of change is also minimum, and as the applied voltage is increased, the amount of change is increased until maximum voltage is applied resulting in a maximum amount of change.

A resistor 40 is placed in parallel with the capacitor to keep this circuit from becoming a tank circuit if the applied voltage should become disconnected while the indicator is still energized.

By the use of a variable resistor or variable inductor, it is possible to change the relative position of the center tap in the indicator fixed coil. A change in the position of the tap in relation to the applied voltage changes the amount of current flow through the moving coil. The variable resistor or inductor is in series with the fixed coil, and there will be a slight drop in current across the coil but such is insignificant to the amount of change in the moving coil. Since there is a large change in the applied voltage across the moving coil and only a small change in the inductor voltage on the moving coil with a change in the variable resistor or inductor, a shift of the position of the moving coil occurs and as the indicator is operated, this shift is relatively linear throughout its range.

The instrument of the present invention can be connected to a suitable transmitter such as the one described in copending application Ser. No. 32,830, filed Apr. 29, 1970. The signal therefrom is received by the indicator described herein which, as previously mentioned, operates on a null balance principle. The torque produced comprises two opposing components, one of which results from the voltage induced in the armature coil 22 and the other results from the voltage impressed upon the field coil 21 because of unbalance of the bridge. The induced voltage varies in accordance with linkage of flux of the field and armature coils, the linkage varying from a maximum when the coils are close together to a minimum when the armature coil is near the free end of hook 18. When the armature circuit has an inductive reactance, the current component, because of the induced voltage will be in lagging phase relation to the flux of the air gap so as to produce a torque component tending to move the armature coil toward the free end of the hook.

The transmitter should be arranged so that the voltage impressed on the armature coil is in at least a partial phase opposition to the induced voltage to produce a second torque component opposing the first component.

It should be apparent that changes can be made in details of construction without departing from the spirit of the invention except as defined in the appended claims.

What is claimed is:

1. In a three-wire dynamometer instrument, the combination comprising a segmented closed magnetic ring, an arcuate pole member within said magnetic ring and closely spaced therefrom to define an air gap therebetween, said pole member having a shank portion attached to the inner periphery of said magnetic ring, a field coil means surrounding said shank portion and connected across two of said wires to produce a flux across said air gap, a movable armature coil connected between said field coil means and the other of said three wires, said armature coil encircling said arcuate pole member and pivotally mounted at the center of curvature thereof, an indicator pointer operatively connected with said armature so as to be movable in response thereof, and electrical range adjusting means mounted on said instrument comprising a resistor means and capacitor means, one of which is adjustable, said resistor means and capacitor means being connected in series with each other and which are connected in parallel with said movable armature coil, so as to adjust the power factor of the applied voltage in said instrument and thereby change the range thereof.

2. A dynamometer instrument as claimed in claim 1 including self-testing means mounted on said instrument.

3. A dynamometer instrument as claimed in claim 1 and including a zero adjustment means connected in one of said wires.

4. A dynamometer instrument as claimed in claim 1 wherein there are a plurality of modules which can be assembled and disassembled, said modules including a first module having a dial, pointer and window, a second module including said movable armature coil and said field coil means, and a third module including said electrical self-test means, said zero adjusting means, and said range adjusting means.

* * * * *